US008606198B1

(12) United States Patent
Wright

(10) Patent No.: US 8,606,198 B1
(45) Date of Patent: Dec. 10, 2013

(54) DIRECTIONAL COUPLER ARCHITECTURE FOR RADIO FREQUENCY POWER AMPLIFIER WITH COMPLEX LOAD

(75) Inventor: Peter V. Wright, Portland, OR (US)

(73) Assignee: TriQuint Semiconductor, Inc., Hillsboro, OR (US)

( * ) Notice: Subject to any disclaimer, the term of this patent is extended or adjusted under 35 U.S.C. 154(b) by 0 days.

(21) Appl. No.: 13/554,843

(22) Filed: Jul. 20, 2012

(51) Int. Cl.
*H04B 1/40* (2006.01)
*H01P 5/12* (2006.01)

(52) U.S. Cl.
USPC .......................... 455/120; 455/126; 333/109

(58) Field of Classification Search
USPC ........... 455/120, 121, 124, 125, 127.1, 127.2, 455/127.3, 126; 333/109, 124
See application file for complete search history.

(56) References Cited

U.S. PATENT DOCUMENTS

| | | | |
|---|---|---|---|
| 5,564,086 A * | 10/1996 | Cygan et al. | 455/126 |
| 6,141,541 A | 10/2000 | Midya | |
| 6,349,216 B1 | 2/2002 | Alberth | |
| 6,438,360 B1 | 8/2002 | Alberth | |
| 7,356,309 B2 | 4/2008 | Fifield | |
| 7,446,626 B2 | 11/2008 | Gorbachov | |
| 7,512,386 B2 * | 3/2009 | Kalajo et al. | 455/127.1 |
| 7,546,089 B2 | 6/2009 | Bellantoni | |
| 8,095,085 B2 * | 1/2012 | Song et al. | 455/107 |
| 8,385,853 B2 * | 2/2013 | Prikhodko et al. | 455/115.3 |
| 8,452,243 B2 * | 5/2013 | Prikhodko et al. | 455/107 |
| 2008/0070519 A1 * | 3/2008 | Okabe | 455/127.1 |
| 2008/0214125 A1 * | 9/2008 | Haque et al. | 455/90.2 |
| 2011/0063044 A1 | 3/2011 | Jones | |

OTHER PUBLICATIONS

Li, Yang, et al.; A Compact High Directivity Coupler with +0.15dB Error under VSWR 2.5:1 for 3x3mm2 UMTS Power Amplifier Modules; IEEE Radio and Wireless Symposium (RWS), 2010 IEEE; pp. 336-339; Jan. 10-14, 2010.
Madic, Jelena, et al.; "Accurate Power Control Technique for Handset PA Modules with Ingtegrated Directional Couplers;" IEEE Radio Frequency Integrated Circuits (RFIC) Symposium, 2003 IEEE; pp. 715-718; Jun. 8-10, 2003.
Mu, Xiaofang, et al.; "Analysis of Output Power Variation under Mismatched Load in Power Amplifier FEM with Directional Coupler;" IEEE Microwave Symposium Digest, 2009; pp. 549-552; MTT '09; IEEE MTT-S International; Jun. 7-12, 2009.
Mu, Xiaofang, et al.; "Minimizing Radiated Power Variation in Power Amplifier FEMs with Directional Couplers;" Signals Systems and Electronics; International Symposium on Signals Systems and Electronics (ISSSE); vol. 2, pp. 1-3; Sep. 2010.

* cited by examiner

*Primary Examiner* — Blane J Jackson
(74) *Attorney, Agent, or Firm* — Schwabe, Williamson & Wyatt, P.C.

(57) ABSTRACT

Various embodiments may provide a circuit including a radio frequency (RF) power amplifier (PA) and a coupler (e.g., a directional coupler). The coupler may be coupled between a first impedance matching section and a second impedance matching section. The first matching section may transform a first impedance at the RF PA to a second impedance at an RF input port of the coupler. The second matching section may transform the second impedance at an RF output port of the coupler to a third impedance at an output terminal. The second impedance may be a real impedance and the third impedance may be a complex impedance. A real part of the third impedance may be greater than a real part of the second impedance. Additionally, the second impedance may be greater than the first impedance.

20 Claims, 5 Drawing Sheets

DIRECTIONAL COUPLER ARCHITECTURE FOR RADIO FREQUENCY POWER AMPLIFIER WITH COMPLEX LOAD

FIELD

Embodiments of the present disclosure relate generally to the field of circuits, and more particularly to a directional coupler architecture for radio frequency amplifiers with complex loads.

BACKGROUND

A radio frequency (RF) transmit chain typically includes an RF power amplifier (PA) to amplify a signal for transmission within a given frequency band. A directional coupler is coupled with the RF PA to sample an output signal from the RF PA and pass the sampled signal to a power detector. The power detector may determine the output power of the output signal. The output power may be adjusted depending on the detected output power. In many transmit chains, the output of the directional coupler is passed to a complex load, such as a duplexer. The complex load requires additional components in the transmit chain to compensate for the complex impedance and/or may cause insertion loss and/or other performance degradation in the transmit chain.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific devices and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present disclosure; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

In providing some clarifying context to language that may be used in connection with various embodiments, the phrases "A/B" and "A and/or B" mean (A), (B), or (A and B); and the phrase "A, B, and/or C" means (A), (B), (C), (A and B), (A and C), (B and C) or (A, B and C).

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other.

Various embodiments may provide a circuit including a radio frequency (RF) power amplifier (PA) and a coupler (e.g., a directional coupler). The coupler may be coupled between a first impedance matching section and a second impedance matching section. The first matching section may transform a first impedance at the RF PA to a second impedance at an RF input port of the coupler. The second matching section may transform the second impedance at an RF output port of the coupler to a third impedance at an output terminal. The second impedance may be a real impedance and the third impedance may be a complex impedance. Additionally a real part of the third impedance may be greater than a real part of the second impedance (e.g., the entire second impedance).

Figure 1:
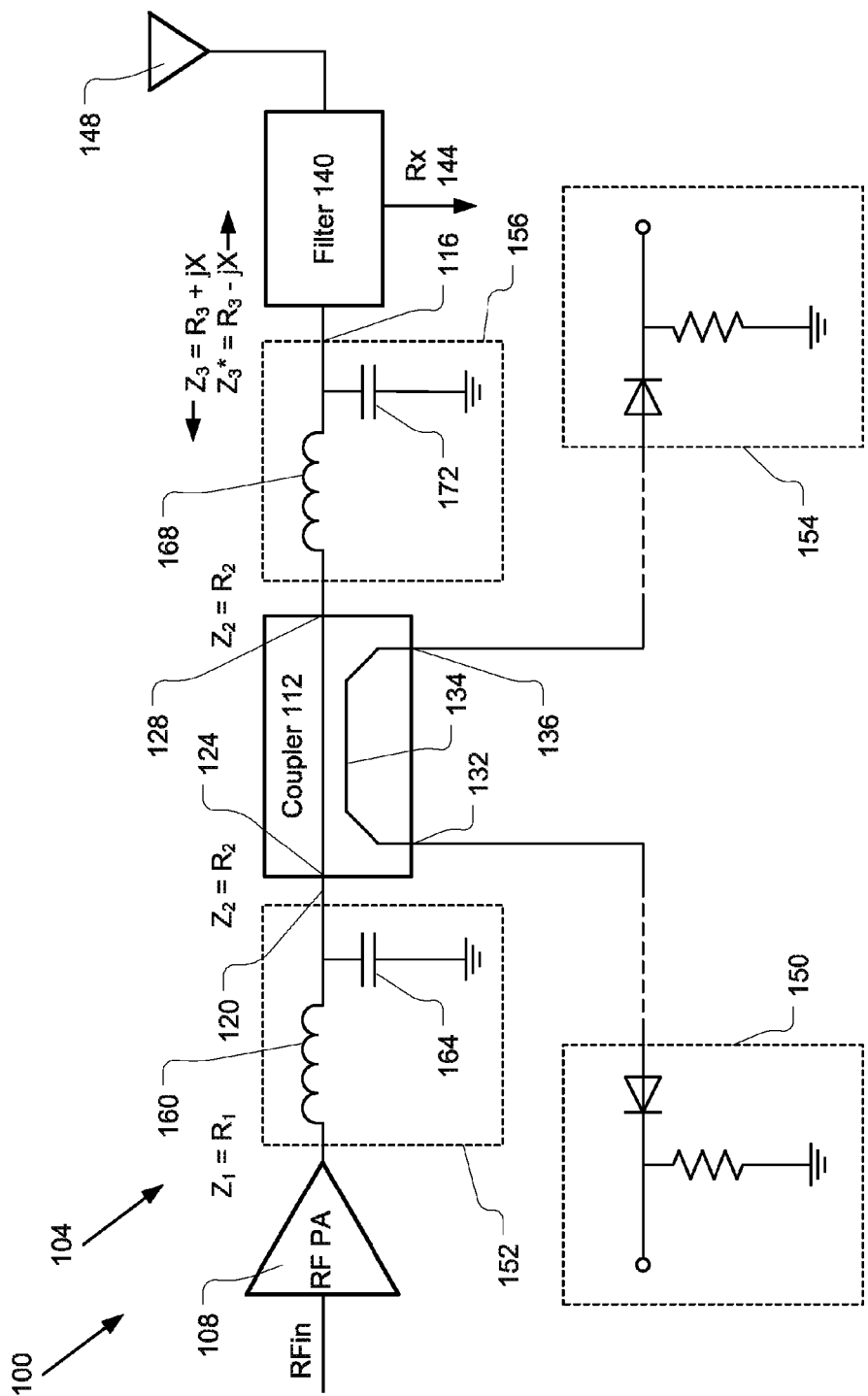
FIG. 1 illustrates a circuit diagram of a radio frequency power amplifier module coupled with an antenna structure and a pair of power detectors in accordance with various embodiments.

FIG. 1 illustrates a circuit 100 in accordance with various embodiments. Circuit 100 may include an RF PA module 104 having an RF PA 108 and a coupler 112. The RF PA 108 may receive an RF input signal RFin (e.g., from a transmitter and/or transceiver) and amplify the RF input signal. The circuit 100 may pass the amplified RF signal to an output terminal 116 on an RF line 120 of circuit 100. The coupler 112 may be coupled with the RF PA 108 via the RF line 120.

The coupler 112 may include an input port 124 (also referred to as RF input port 124), an output port 128 (also referred to as RF output port 128), a first coupling port 132, and a second coupling port 136. The coupler 112 may receive the amplified RF signal at the input port 124 and may produce a forward power signal at the first coupling port 132 (e.g., on a coupled line 134 of coupler 112) corresponding to a forward output power on the RF line 120 (e.g., the power transferred in a forward direction on the RF line 120 from the input port 124 to the output port 128.

The forward power signal may have a power that is proportional to the forward output power of the amplified RF signal. For example, in one embodiment, the coupler 112 may have a coupling factor of about 20 decibels (dB). In that case, the power of the forward power signal at the first coupling port 132 may be about one-hundredth (1 percent) of the power of the amplified RF signal output from the RF PA 108.

In some embodiments, the coupler may also produce a backward power signal at the second coupling port 136. The backward power signal may have a power corresponding to a backward power on the RF line 120 (e.g., traveling from the output port 128 to the input port 124 on the RF line 120). The backward power signal may be propagated in the opposite direction on coupled line 134 from the forward power signal.

The coupler 112 may pass the RF signal from the input port 124 to the output port 128 of the coupler 112 (minus power loss due to the coupler 112). The RF signal may then be passed to the output terminal 116. The circuit 100 may further include a filter 140 coupled with the output terminal 116 to receive the RF signal. The filter 140 may suppress spurious emissions such as harmonics and/or noise, and may isolate the transmit chain (e.g., including the RF line 120) from the receive chain (e.g., receive line 144). The filter 140 may be any suitable type of filter, such as a duplexer. The filter 140 may have a complex impedance with a large reactance (imaginary component). In some embodiments, the filter 140 may be included in the RF PA module 104. In other embodiments, the filter 140 may be separate from the RF PA module 104.

The filter 140 may pass the RF signal from the RF PA module 104 to an antenna structure 148. The antenna structure 148 may include one or more antennas and/or an antenna switch. The antenna structure 148 may transmit the RF signal over a wireless communication network.

Other embodiments of the circuit 100 may not include the filter 140. In these embodiments, another component may be coupled with the output terminal 116 to receive the amplified RF signal. The other component may have a complex input impedance.

In various embodiments, the forward power signal may be passed to a first power detector 150 via the coupled line 134. The first power detector 150 may determine an output power of the RF PA 108 based on the forward power signal. The output power may be adjusted based on the determined output power to maintain the output power within a specified range.

In some embodiments, the backward power signal may be passed to a second power detector 154. The second power detector 154 may determine the backward power travelling on the RF line 120 in the backward direction (e.g., from the output port 128 to the input port 124 of the coupler 112). The determined backward power may be used to determine an amount of reflected energy by filter 140 and/or antenna structure 148 (e.g., due to antenna mismatch).

In some embodiments, the first power detector 150 and/or second power detector 154 may be included in a separate component from the RF PA module 104, such as in the transmitter that provides the RF input signal to the RF PA 108 and/or in a separate controller.

In conventional RF PA systems, an impedance matching network (including multiple matching sections) is disposed between the RF PA and the coupler to match the output impedance at the RF PA to the complex input impedance of the filter. The output impedance of the RF PA may be lower than the impedance at the filter. However, in these systems, the coupler may be disposed in a region of a complex conjugate match between the reactive output impedance of the matching network and the reactive input impedance of the filter. This may cause significant energy to propagate both forwards and backwards on the RF line, thereby degrading the accuracy of the coupler. The problem is made worse by the impedance of the antenna structure, which may vary (e.g., depending on nearby objects/interference), thereby creating an impedance mismatch.

Other systems place a reactive load on the second coupling port of the coupler (also referred to as the isolation port) to reflect a portion of the coupled backward power back to the first coupling port and reduce the power variation with impedance mismatch. However, this design eliminates the usefulness of the backward power signal, is effective to cancel out coupled power variation over only a narrow bandwidth, and does not allow daisy-chaining of the coupler outputs with other couplers in a multi-band transmission system.

Yet other systems place an inductor between the coupler and the filter to tune out the reactance of the filter (with the real part of the input impedance at the filter equal to the real impedance at the coupler output). However, these systems have increased size, cost, and insertion loss compared with systems without the additional inductor.

In various embodiments, the RF PA module 104 of the present disclosure may include a first matching section 152 and a second matching section 156. The first matching section 152 and second matching section 156 may be collectively referred to as the matching network of the RF PA module 104. The first matching section 152 may include one or more inductors 160 and/or capacitors 164, and the second matching section 156 may include one or more inductors 168 and/or capacitors 172. The coupler 112 may be coupled between the first matching section 152 and the second matching section 156 on the RF line 120.

The first matching section 152 may be coupled between the RF PA 108 and the input port 124 of the coupler 112 to transform a first impedance $Z_1$ at the RF PA 108 to a second impedance $Z_2$ at the input port 124. The second matching section 156 may be coupled between the output port 128 of the coupler 112 and the output terminal 116 to transform the second impedance $Z_2$ at the output port 128 to a third impedance $Z_3$ at the output terminal 116.

In various embodiments, the second impedance may be a real impedance and the third impedance may be a complex impedance. For example, the second impedance may be equal to a resistance $R_2$, while the third impedance may include a real (resistance) component $R_3$ and an imaginary (reactance) component X. The imaginary component of the third impedance may be positive or negative depending on the direction of signal propagation on the RF line 120 as shown in FIG. 1. The complex input impedance of the filter 140 may be equal to the third impedance. In various embodiments, the first impedance at the output of the RF PA 108 may be a real impedance (e.g., equal to a resistance $R_1$).

In various embodiments, the real part of the third impedance may be greater than the real part of the second impedance (e.g., $R_3 > R_2$). Additionally, or alternatively, the real part of the second impedance may be greater than the real part of the first impedance (e.g., $R_2 > R_1$). For example, in one embodiment, the real part $R_1$ of the first impedance may be about 4 Ohms and the real part $R_3$ of the third impedance may be about 50 Ohms. In that case, the real part $R_2$ of the second impedance may be between about 4 Ohms and about 50 Ohms, such as about 15 to about 25 Ohms (e.g., about 19 Ohms).

Accordingly, the configuration of RF PA module 104 may provide a real impedance at the coupler input port 124 and output port 128, thereby reducing variation of the forward power signal due to impedance mismatch at the antenna structure 148 (e.g., caused by a varying impedance of antenna structure 148). Additionally, the configuration of RF PA module 104 may not require any additional elements to tune out the reactance of the filter 140, thereby improving insertion loss.

Furthermore, the first coupling port 132 and/or second coupling port 136 may be daisy-chained (e.g., coupled in series) with other couplers on the coupled line 134, with relatively wideband operation. Accordingly, a plurality of RF PA modules (e.g., similar to RF PA module 104) may be coupled with the same power detectors (e.g., first detector 150 and second detector 154) on the coupled line 134. The plurality of RF PA modules may operate on different frequency bands (e.g., be used to amplify RF signals within different frequency ranges). In some embodiments, a plurality of RF PA modules may be packaged together in a same package with a daisy-chain orientation.

Figure 2:
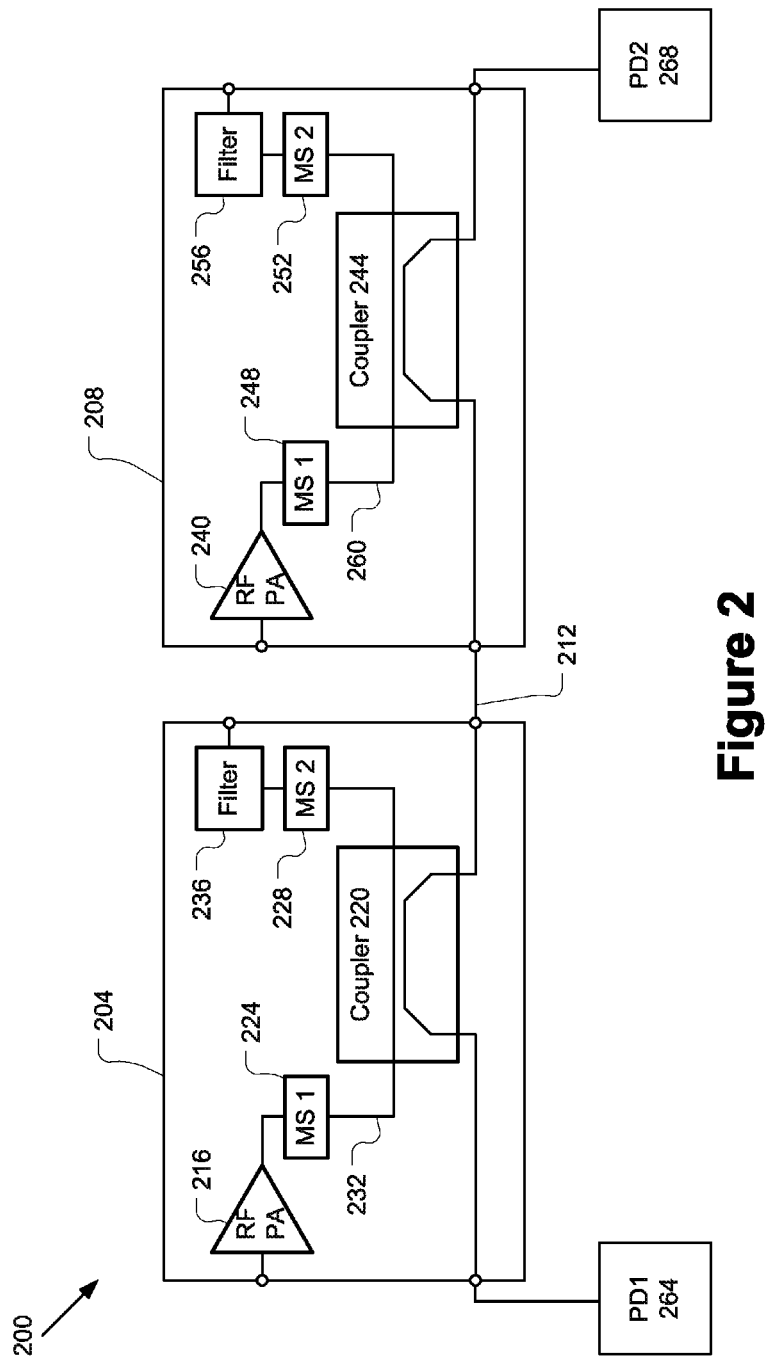
FIG. 2 illustrates a circuit diagram of a circuit including a pair of radio frequency power amplifier modules coupled with a pair of power detectors in accordance with various embodiments.

For example, FIG. 2 shows a system 200 including a first RF PA module 204 and a second RF PA module 208 coupled in series via a coupled line 212. Other embodiments may include any suitable number of RF PA modules. First RF PA module 204 and second RF PA module 208 may be similar to RF PA module 104 discussed herein. As shown in FIG. 2, first RF PA module 204 may include an RF PA 216 and a coupler 220. The coupler 220 may be coupled between a first matching section 224 and a second matching section 228 on an RF line 232. The first RF PA module 204 further includes a filter 236 to receive amplified RF signals from the RF PA 216. Second RF PA module 208 may include an RF PA 240, a coupler 244, a first matching section 248, a second matching section 252, and a filter 256 coupled to one another via an RF line 260 at least as shown.

In various embodiments, the coupler 220 of the first RF PA module 204 may be coupled with the coupler 244 of the second RF PA module 208 on the coupled line 212. A first power detector 264 may be coupled to a first end of the coupled line 212 to detect the forward power signal from the coupler 220 and/or coupler 244. A second power detector 268 may be coupled to a second end of the coupled line 212 to detect the backward power signal from the coupler 220 and/or coupler 244. Only one of the RF PA modules 204 or 208 may be active (e.g., receiving an RF signal on the respective RF line 232 or 260) at a given time. For example, the first RF PA module 204 and second RF PA module 208 may be used to amplify RF signals in different frequency bands. Accordingly, the power detector 264 and/or 268 may detect the respective power signal from the active RF PA module without significant interference from the non-active RF PA module.

Referring again to FIG. 1, in some embodiments, the coupler 112 may provide a higher impedance on the coupling line 134 (e.g., at the first coupling port 132 and second coupling port 136) than on the RF line 120 (e.g., at the input port 124 and output port 128). For example, in one embodiment, the coupler 112 may provide a 50 Ohm impedance at the first coupling port 132 and second coupling port 136. The higher impedance may be needed to match a specification and/or other requirement of other components on the coupled line 134, such as the first power detector 150 and/or second power detector 154.

Figure 3A:
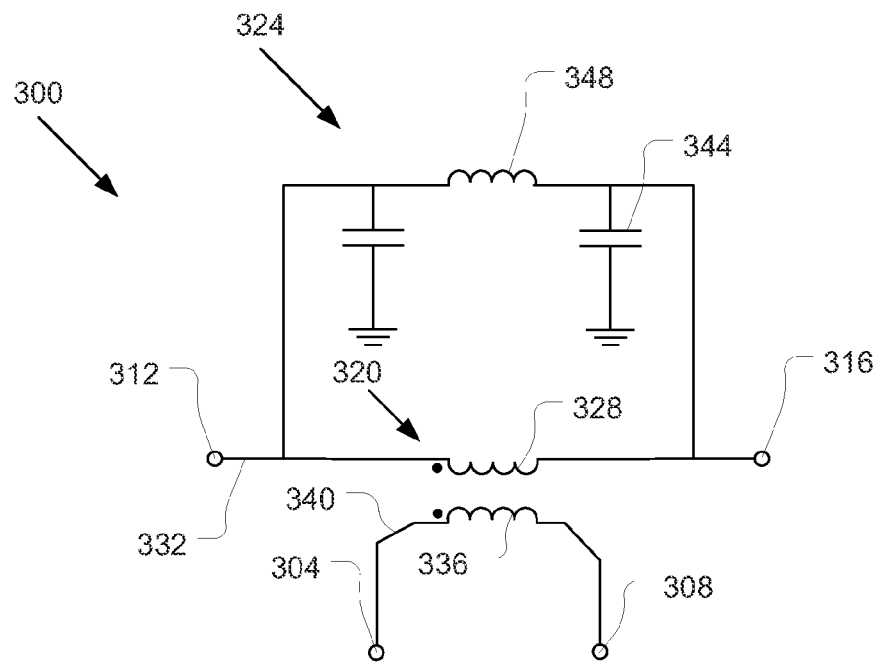
FIG. 3A illustrates a circuit diagram of a directional coupler in accordance with various embodiments.

FIG. 3A illustrates a coupler 300 that provides a higher impedance at a first coupling port 304 and a second coupling port 308 than at an input port 312 and an output port 316. The coupler 300 may include a coupling structure 320 and a pi-section 324. The coupling structure 320 may include a first inductor 328 on an RF line 332 and a second inductor 336 on a coupled line 340. The second inductor 336 may produce the forward and backward power signals as described herein. The pi-section 324 may be coupled in shunt with an RF line 332 to reduce the impedance at the input port 312 and output port 316. Accordingly, the impedance at the first coupling port 304 and second coupling port 308 may be higher than the impedance at the input port 312 and output port 316.

The pi-section 324 may include one or more capacitors 344 and/or a bypass inductor 348. In some embodiments, the capacitors 344 and/or bypass inductor 348 may be integrated into the components of the coupling structure 320.

Figure 3B:
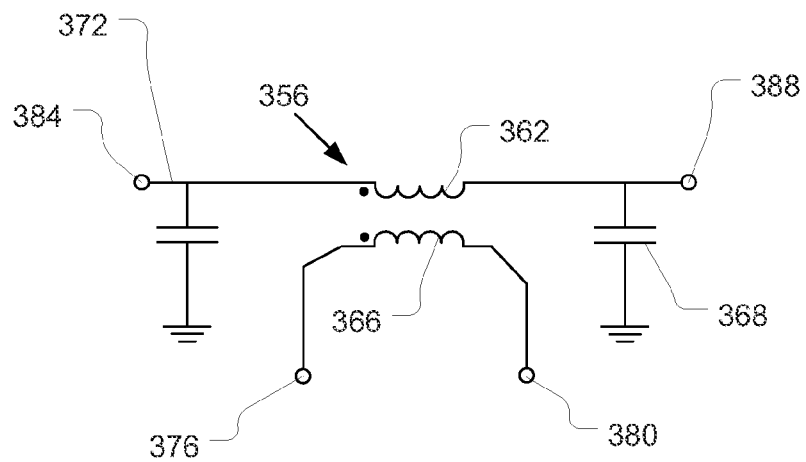
FIG. 3B illustrates an alternative circuit diagram of a directional coupler in accordance with various embodiments.

For example, FIG. 3B illustrates a coupler 352 that is mathematically equivalent to the coupler 300 of FIG. 3A but does not include a pi-section. Coupler 352 includes a coupling structure 356 having a first inductor 360 and a second inductor 366. The first inductor 360 and second inductor 364 may have different inductances (e.g., a small difference in inductance value). The coupler 352 may further include a pair of capacitors 368 coupled in shunt with an RF line 372. The coupler 352 may provide a higher impedance at a first coupling port 376 and a second coupling port 380 than at an input port 384 and an output port 388.

Figure 4:
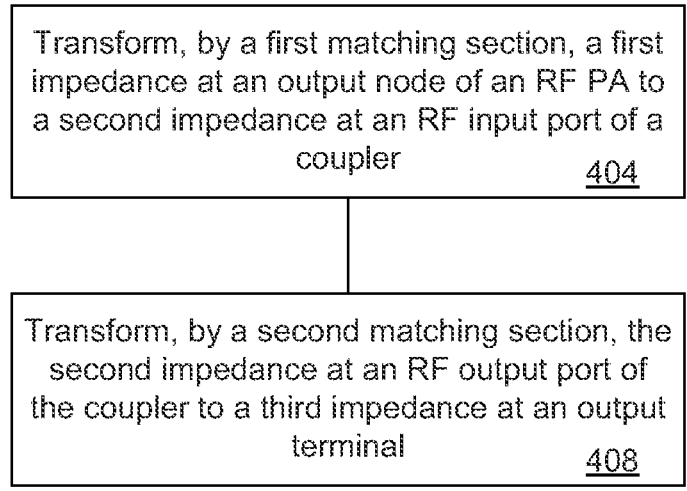
FIG. 4 is a flow diagram of a method of matching impedances in a radio frequency power amplifier module in accordance with various embodiments.

FIG. 4 illustrates a block flow diagram of a method 400 in accordance with various embodiments. The method 400 may be performed by an RF PA module (e.g., RF PA module 104). The RF PA module may pass an amplified RF signal from an RF PA to a filter (e.g., filter 140) and/or other structure with a complex input impedance.

At 404, a first matching section of the RF PA module may transform a first impedance at an output node of the RF PA to a second impedance at an RF input port of a coupler (e.g., directional coupler). The coupler may produce a forward power signal and/or backward power signal as discussed above.

At 408, a second matching section may transform a second impedance at an RF output port of the coupler to a third impedance at an output terminal. The output terminal may be coupled with the filter and/or other component with a complex input impedance.

In various embodiments, as discussed above, the third impedance may be complex and the second impedance may be real. Additionally, the real part of the second impedance may be greater than the real part of the first impedance and less than the real part of the third impedance.

Figure 5:
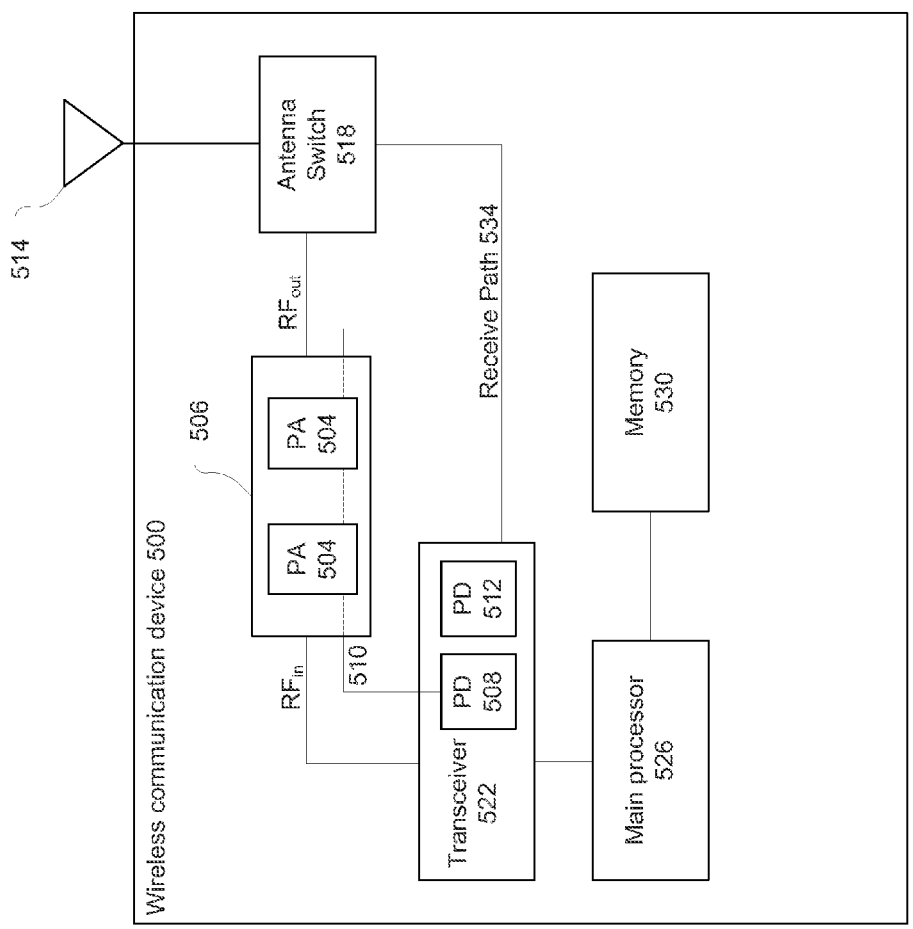
FIG. 5 is a block diagram of an exemplary wireless communication device in accordance with various embodiments.

A block diagram of an exemplary wireless communication device 500 incorporating a plurality of RF PA modules 504, which may be similar to RF PA module 104, is illustrated in FIG. 5 in accordance with some embodiments. The RF PA modules 504 may be included in an RF PA block 506. In addition to the RF PA modules 504, the wireless communication device 500 may have an antenna structure 514, an antenna switch 518, a transceiver 522, a main processor 526, and a memory 530 coupled with each other at least as shown. While the wireless communication device 500 is shown with transmitting and receiving capabilities, other embodiments may include devices with only transmitting or only receiving capabilities.

In various embodiments, the wireless communication device 500 may be, but is not limited to, a mobile telephone, a paging device, a personal digital assistant, a text-messaging device, a portable computer, a desktop computer, a base station, a subscriber station, an access point, a radar, a satellite communication device, or any other device capable of wirelessly transmitting/receiving RF signals.

The main processor 526 may execute a basic operating system program, stored in the memory 530, in order to control the overall operation of the wireless communication device 500. For example, the main processor 526 may control the reception of signals and the transmission of signals by transceiver 522. The main processor 526 may be capable of executing other processes and programs resident in the memory 530 and may move data into or out of memory 530, as desired by an executing process.

The transceiver 522 may receive outgoing data (e.g., voice data, web data, e-mail, signaling data, etc.) from the main processor 526, may generate the $RF_{in}$ signal(s) to represent the outgoing data, and provide the $RF_{in}$ signal(s) to one or more of the RF PA modules 504. The transceiver 522 may also control the RF PA modules 504 to operate in selected bands and in either full-power or backoff-power modes.

The RF PA module 504 may amplify the $RF_{in}$ signal(s) to provide $RF_{out}$ signal(s) as described herein. The $RF_{out}$ signal(s) may be forwarded to the antenna switch 518 and then to the antenna structure 514 for an over-the-air (OTA) transmission. The antenna switch 518 may enable a plurality of the RF PA modules 504 to transmit using one or more common antennas. In other embodiments, one or more of the RF PA modules 504 may be coupled with a dedicated antenna for the individual RF PA module 504. In that case, the antenna switch 518 may not be included and/or the RF PA module 504 may be coupled directly to the antenna structure 514.

In some embodiments, the RF PA module 504 may include a filter (e.g., a duplexer) to suppress spurious emissions such as harmonics and/or noise, and/or to isolate the transmit chain from the receive chain. In these embodiments, the $RF_{out}$ signal(s) may be routed through the filter. The output of each filter may be coupled with the antenna switch 518.

One or more of the RF PA modules 504 may include a coupler to sample the $RF_{out}$ signal(s) to produce a forward power signal and/or backward power signal as described herein. The forward power signal may be passed to a first power detector 508 on a coupled line 510, and the backward power signal may be passed to a second power detector 512 on the other end of the coupled line 510. In some embodiments, the first power detector 508 and/or second power detector 512 may be included in the transceiver 522 as shown. In other embodiments, the power detectors 508 and/or 512 may be included in one or more separate components from the transceiver 522. The first power detector 508 may receive the power signal and determine the power of the $RF_{out}$ signal(s). The transceiver 522 may use this information to adjust the output power of the RF PA module 504.

The wireless communication device 500 may include any suitable number of RF PA modules 504, such as about one to about ten RF PA modules.

The transceiver 522 and/or RF PA block 506 may include logic to select the appropriate RF PA module 504 to amplify the $RF_{in}$ signal(s) based on the frequency of the $RF_{in}$ signal(s), pass the $RF_{in}$ signal(s) to the corresponding RF PA module 504, and/or trigger the switch in the corresponding RF PA module 504 to couple and/or decouple the coupler of the RF PA module 504 with the sensing line (e.g., according to method 300).

In various embodiments, the transceiver 522 may also receive an incoming OTA signal from the antenna structure 514 via a receive path 534. In some embodiments, the receive path 534 may be separated from the transmit path (e.g., including the $RF_{in}$ and $RF_{out}$ signals) by the antenna switch 518 (e.g., for time division duplex (TDD) systems). In other embodiments, both the transmit and receive signals may be passed through the same arm of the antenna switch, and the receive path 524 may be separated from the transmit path by a duplexer (e.g., for frequency division duplex (FDD) systems). In some such embodiments, the duplexer may be included in the PA 504 as discussed above. The transceiver 522 may process and send the incoming signal to the main processor 526 for further processing.

In various embodiments, the antenna structure 514 may include one or more directional and/or omnidirectional antennas, including, e.g., a dipole antenna, a monopole antenna, a patch antenna, a loop antenna, a microstrip antenna or any other type of antenna suitable for OTA transmission/reception of RF signals.

Those skilled in the art will recognize that the wireless communication device 500 is given by way of example and that, for simplicity and clarity, only so much of the construction and operation of the wireless communication device 500 as is necessary for an understanding of the embodiments is shown and described. Various embodiments contemplate any suitable component or combination of components performing any suitable tasks in association with wireless communication device 500, according to particular needs. Moreover, it is understood that the wireless communication device 500 should not be construed to limit the types of devices in which embodiments may be implemented.

Although the present disclosure has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present disclosure. Those with skill in the art will readily appreciate that the teachings of the present disclosure may be implemented in a wide variety of embodiments. This description is intended to be regarded as illustrative instead of restrictive.

What is claimed is:

1. An apparatus comprising:
a radio frequency (RF) power amplifier (PA) module including an RF PA configured to amplify an RF signal, wherein the RF PA module is configured to pass the amplified RF signal to an output terminal;
a directional coupler having an RF input port, an RF output port, and a first coupling port, the input port configured to receive the amplified RF signal from the RF PA and to pass the amplified RF signal to the RF output port, and the directional coupler configured to produce a forward power signal at the first coupling port corresponding to a forward output power from the RF input port to the RF output port;
a first matching section coupled between the RF input port and the RF PA to transform a first impedance at the RF PA to a second impedance at the RF input port; and
a second matching section coupled between the RF output port and the output terminal to transform the second impedance at the RF output port to a third impedance at the output terminal.

2. The apparatus of claim 1, wherein the second impedance is a real impedance.

3. The apparatus of claim 2, wherein the third impedance is a complex impedance.

4. The apparatus of claim 3, wherein the output terminal is configured to be coupled with a duplexer having a complex input impedance equal to the third impedance.

5. The apparatus of claim 3, wherein a real part of the second impedance is greater than a real part of the first impedance and a real part of the third impedance is greater than the real part of the second impedance.

6. The apparatus of claim 1, wherein the directional coupler is configured to provide a higher impedance at the first coupling port than at the RF input port.

7. The apparatus of claim 1, wherein the directional coupler further includes a second coupling port configured to produce a backward power signal at the second coupling port corresponding to a backward output power from the RF output port to the RF input port.

8. The apparatus of claim 7, wherein the directional coupler is configured to pass the forward power signal to a first power detector and to pass the backward power signal to a second power detector.

9. The apparatus of claim 8, wherein the RF power amplifier, the directional coupler, and the first and second matching sections are included in a first RF PA module, wherein the RF PA is a first RF PA and the directional coupler is a first directional coupler, and wherein the apparatus further comprises:

a second RF PA module including:
  a second RF PA configured to produce an output signal over a different frequency band than first RF PA; and
  a second directional coupler coupled with the first directional coupler in a daisy chain configuration on a shared coupling path.

10. A method comprising:
transforming, by a first matching section, a first impedance at an output node of a radio frequency (RF) power amplifier (PA) to a second impedance at an RF input port of a directional coupler; and
transforming, by a second matching section, the second impedance at an RF output port of the directional coupler to a third impedance at an output terminal;
wherein the second impedance is a real impedance and the third impedance is a complex impedance having a real part that is greater than the second impedance.

11. The method of claim 10, further comprising passing an amplified RF signal to a duplexer at the output terminal.

12. The method of claim 11, wherein the second impedance is greater than the first impedance.

13. The method of claim 10, further comprising:
producing a forward power signal at a first coupling port of the directional coupler corresponding to a forward output power on an RF line; and
providing a fourth impedance at the first coupling port that is higher than the second impedance.

14. The method of claim 13, further comprising:
producing a backward power signal at a second coupling port of the directional coupler corresponding to a backward output power on the RF line; and
providing the fourth impedance at the second coupling port.

15. A system, comprising:
a transmitter;
a plurality of radio frequency (RF) power amplification modules coupled together via a coupled line, the individual RF power amplification modules including;
  an RF power amplifier configured to amplify an RF input signal received from the transmitter and to pass an RF output signal on an RF line;
  a coupler coupled with the RF power amplifier via the RF line and having first and second coupling ports coupled with the coupled line, the coupler configured to produce a forward power signal at the first coupling port having a fraction of a forward RF power on the RF line, and to produce a backward power signal at the second coupling port having a fraction of a backward RF power on the RF line;
  a first matching section coupled between the RF power amplifier and the coupler on the RF line, the first matching section configured to transform a first impedance at the RF PA to a second impedance at RF ports of the coupler;
  a second matching section coupled between the coupler and an output terminal of the RF power amplification module to transform the second impedance at the RF ports to a third impedance at the output terminal;
  a first power detector coupled with a first end of the coupled line to receive the forward power signal; and
  a second power detector coupled with a second end of the coupled line to receive the backward power signal;
  wherein the second impedance is a real impedance and the third impedance is a complex impedance.

16. The system of claim 15, further including a duplexer coupled with the output terminal of the RF power amplification module to receive the RF output signal, the duplexer presenting a complex impedance equal to the third impedance.

17. The system of claim 15, wherein the second impedance is greater than the first impedance and less than the third impedance.

18. The system of claim 15, wherein a real part of the third impedance is greater than a real part of the second impedance.

19. The system of claim 15, wherein the plurality of RF power amplification modules are configured to amplify RF input signals over different ranges of frequency.

20. The system of claim 15, wherein the transmitter, the plurality of RF power amplification modules, and the first and second power detectors are included in a wireless communications device.

* * * * *